July 21, 1970  J. C. KIDBY  3,521,464
TORQUE TRANSMITTING SHAFT ASSEMBLIES
Filed April 8, 1968  4 Sheets-Sheet 3
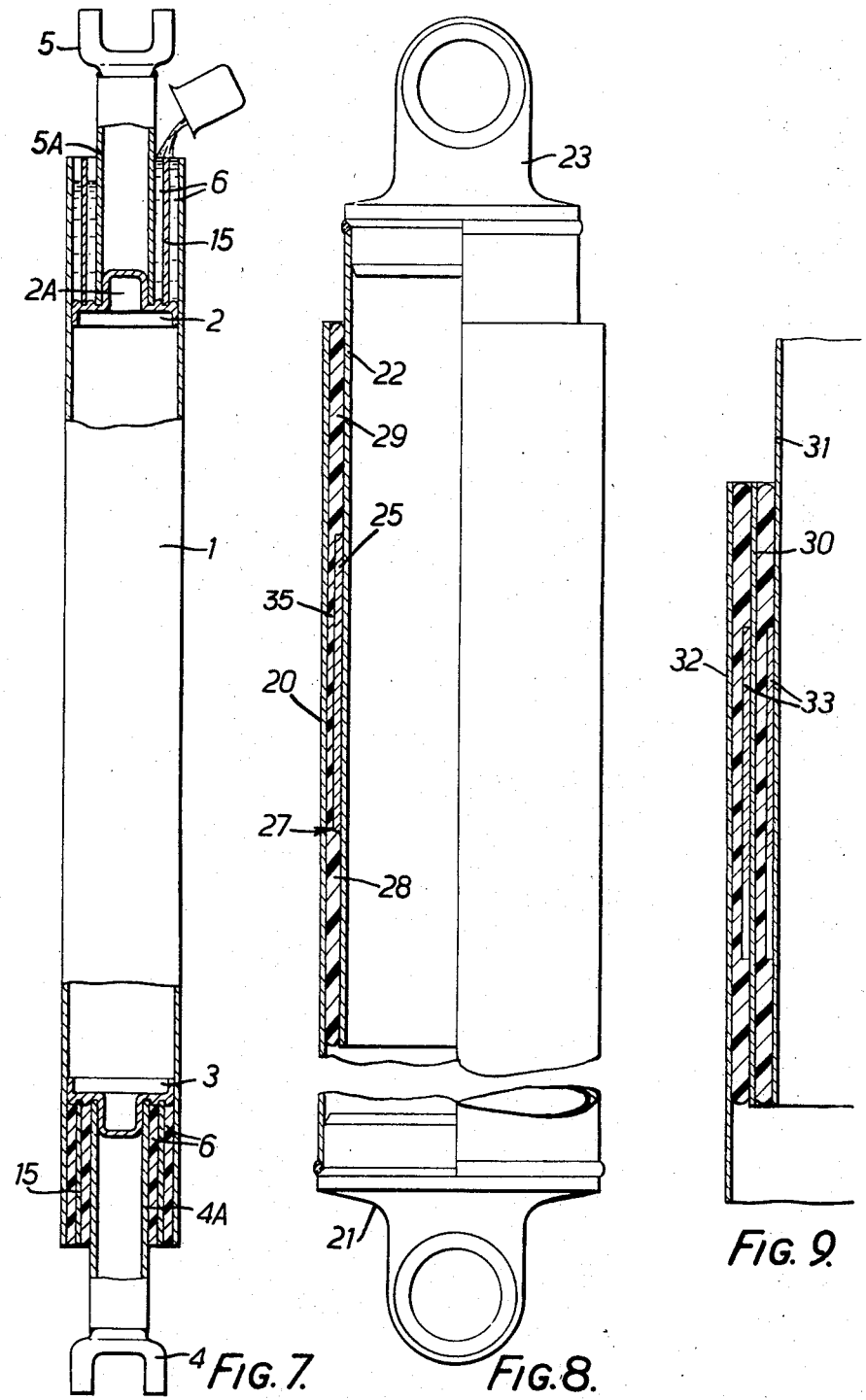
INVENTOR
JAMES C. KIDBY
BY
Watson, Cole, Grindle & Watson
ATTORNEY

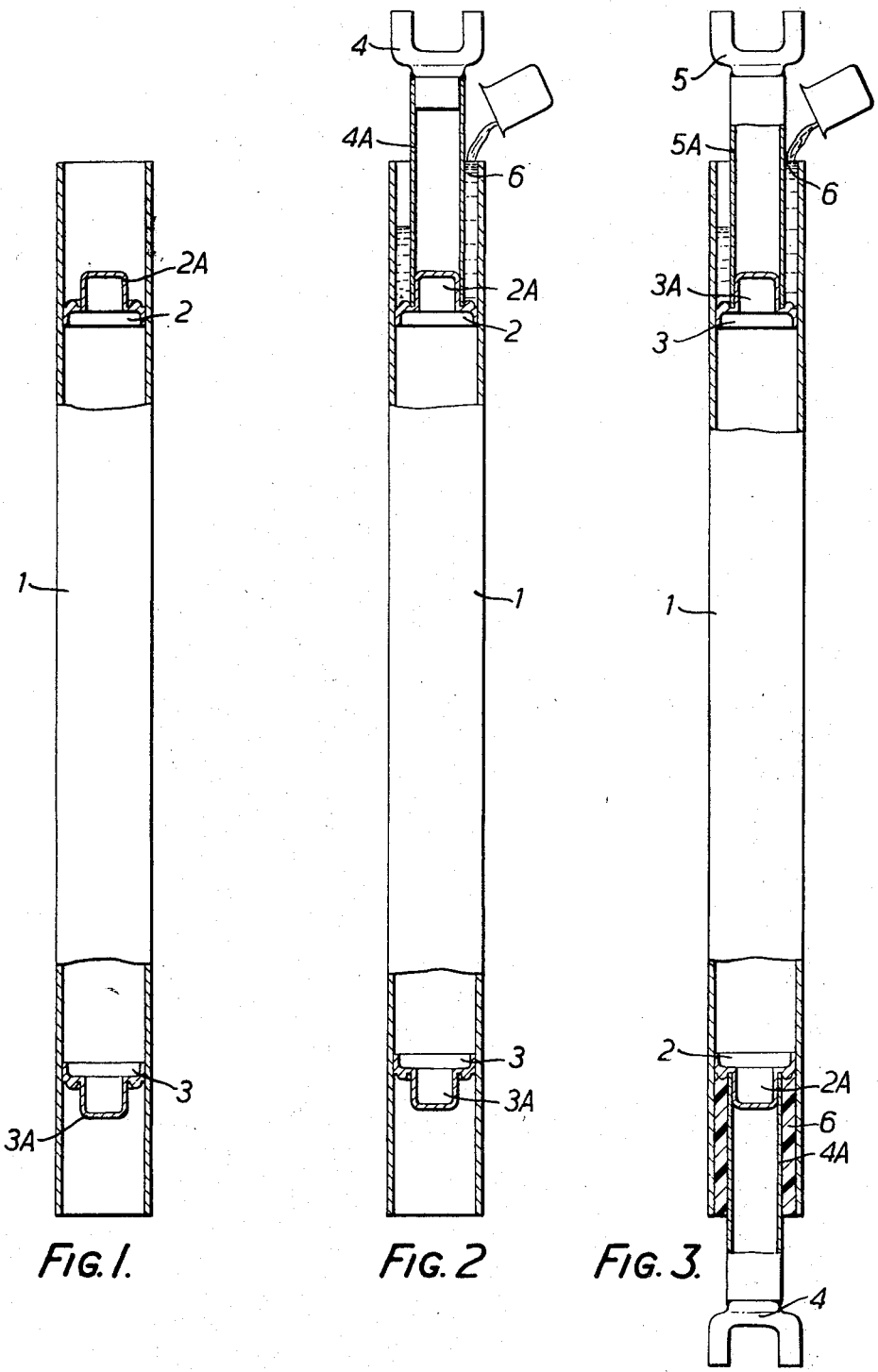

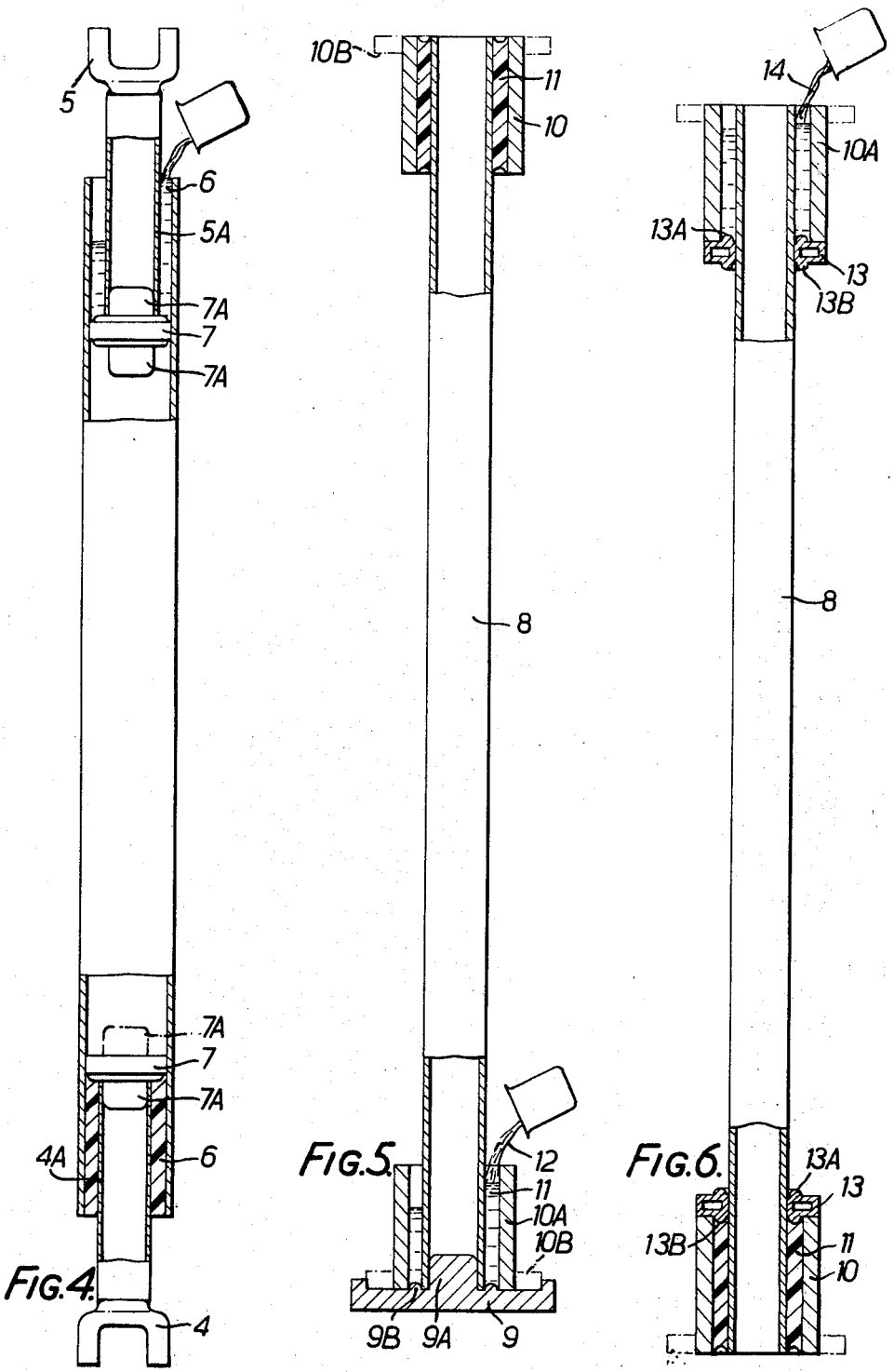

United States Patent Office 3,521,464
Patented July 21, 1970

3,521,464
TORQUE TRANSMITTING SHAFT ASSEMBLIES
James C. Kidby, Crawley, England, assignor to Silentbloc Limited, Crawley, Sussex, England, a company of Great Britain
Filed Apr. 8, 1968, Ser. No. 719,410
Claims priority, application Great Britain, Apr. 7, 1967, 16,104/67
Int. Cl. F16d 3/58
U.S. Cl. 64—11                                                8 Claims

ABSTRACT OF THE DISCLOSURE

The invention provides novel torque transmitting shaft assemblies and methods of making such assemblies. A straight metallic tube has a concentric connecting member secured to one or both ends by a torsional joint formed by injecting or pouring a cast-bondable material, e.g., polyurethane in an uncured and fluid condition into an annular space, which material is thereafter allowed to set into a resilient mass and during the setting bonds with the cylindrical surfaces of the tube and connecting member.

---

This invention relates to torque transmitting shaft assemblies of the kind (employed for example for the propeller shaft or Carden shaft in road vehicle transmission systems), comprising a straight metallic tube constituting the body of the assembly and connecting members secured to the ends of the tube and formed for connection respectively to a driving and driven member, for example to the output shaft of a variable ratio gear box and to the input shaft of a road vehicle back axle, usually through some form of so-called universal joints.

Many proposals have been made to provide a degree of torsional bexibility in such torque-transmitting shaft assemblies (with or without some degree of general flexibility) for the purpose of preventing or reducing the transmission of vibratory forces through the shaft assembly, for example those which are liable to produce noise. In some of such prior proposals the connecting members have been connected to the metallic tube by bushings of rubber radially compressed between parts of the tube and cylindrical parts of the connecting members disposed concentrically with, but spaced from the metallic tube. With such arrangements, however, it is difficult or impossible to provide for sufficient frictional adherence of the rubber bushings to the tube and/or the appropriate parts of the connecting members to transmit the torsional loads imposed, while employing an acceptable overall diameter for the assembly as a whole while if, in order to maintain a reasonably acceptable overall diameter and provide for additional torque transmission, the rubber bushings and the parts with which they engage are lengthened, assembly of the rubber bushings under the required degree of radial compression becomes difficult or impossible. It has also been proposed to employ similar arrangements in which the rubber bushings are bonded to the circumferential surfaces between which they lie, but this represents difficulty in that the bonding of rubber to metal requires curing under pressure and at an appropriate temperature, and the substantial length of the assembly as a whole makes this highly inconvenient, or a practical impossibility, for large scale production.

It is an object of the present invention to provide an improved form of flexible torque transmitting shaft assembly which will lend itself to production in quantity without being subject to the above difficulties.

A torque transmitting shaft assembly according to the present invention comprises a straight metallic tube constituting the body of the assembly, a connecting member at at least one end of the tube which comprises a metallic part concentric with and spaced by an annular space from the tube, and an annular filling of flexible resilient cast-bondable plastics material disposed within the said annular space and united by bonding to the cylindrical surfaces of the tube and connecting member between which it lies.

By the term "cast-bondable plastics material" is to be understood polyurethane or other plastics material of a grade which has the property of being capable in its uncured state of being poured as a liquid or injected as a paste into a space between two metallic parts, usually after treating the parts with a bonding agent, and of then setting into a resilient mass, during which setting it bonds itself to the metallic surfaces between which it lies, no pressure being needed to effect this bonding process.

In some cases one or each of the annular bodies of cast-bondable plastics material may have embedded in it one or more tubular metallic reinforcing elements concentric with the tube and the appropriate part of the connecting member, and in the case of two or more of such reinforcing elements spaced from each other, in which arrangements it will be understood that the plastics material will be bonded also to such reinforcing element or elements.

According to another aspect of the invention the method of making a torque transmitting shaft assembly according to the invention comprises disposing and maintaining concentric with each end of a straight metallic tube, a tubular connecting member with the adjacent circumferential surfaces of the connecting member and the metallic tube spaced from one another by an annular space, sealing one end of such annular space by a sealing element and pouring or injecting into such annular space from the still open end a cast-bondable plastics material, which then sets and thus becomes a flexible resilient body bonded to the circumferential surfaces between which it lies, the sealing element being then detachable or being of such thin and/or destructible nature as to leave the cast-bondable material substantially the sole effective connecting means between the tubular shaft and the connecting member.

In this method each tubular connecting member may extend within the adjacent end of the metallic tube or may surround the adjacent end of the metallic tube, the former arrangement lending itself to the method in which each of the sealing elements is made of thin and/or destructible material, while with the latter arrangement such sealing element may be removable after the plastics material has set instead of being of a destructible nature.

Three methods of constructing torque transmitting shaft assemblies according to the invention are shown by way of example in the accompanying drawings, in which:

FIGS. 1 to 3 show three stages in one method of manufacturing a torque transmitting shaft assembly according to the invention;

FIG. 4 illustrates a modification of the method to which FIGS. 1 to 3 relate;

FIGS. 5 and 6 show two methods of constructing a second form of torque transmitting shaft assembly according to the invention;

FIG. 7 shows a modification of a shaft assembly which may be constructed by a method generally similar to that to which in FIGS. 1 to 3 relate;

FIG. 8 illustrates, in part longitudinal cross-section, an alternative form of torque-transmitting shaft in which only one end is provided with a torsional joint;

FIG. 9 illustrates an arrangement in which a joint includes a reinforcing sleeve and a pair of spacer tubes, as shown in FIG. 8A of the drawings.

Figure 8A:
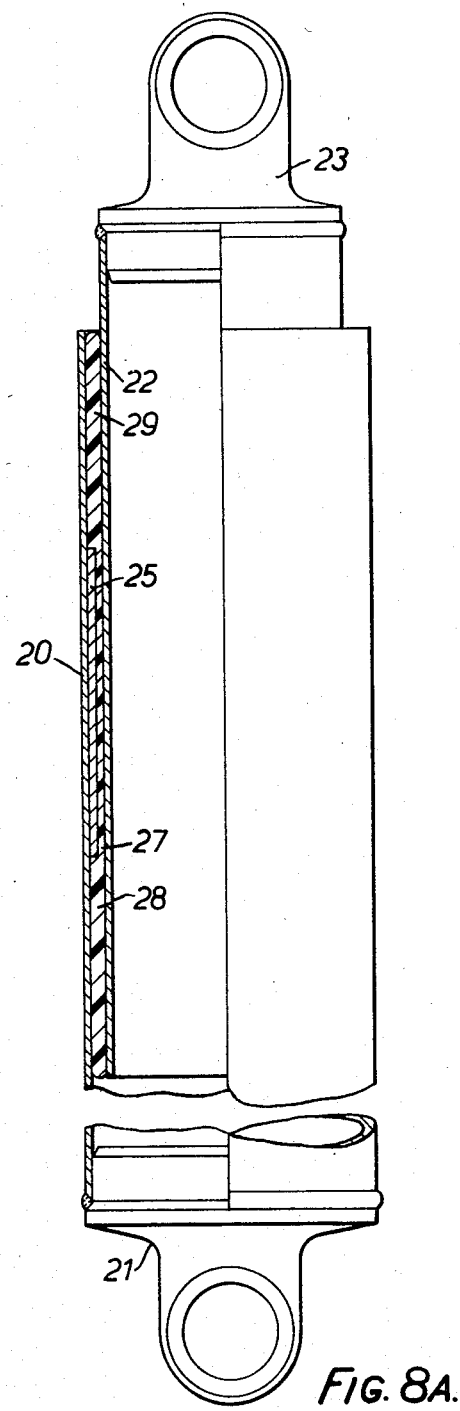
FIG. 8A is a view similar to FIG. 8 showing another alternative form of torque-transmitting shaft.

In the method of construction shown in FIGS. 1 to 3 a straight metallic tube 1, which is to form the body of the assembly, has inserted into its ends two sealing elements 2 and 3, which may be made, for example, of thin metal or some other light and cheap material such as paper-mache or a thin plastics material, as shown in FIG. 1, each of these sealing elements being a frictional fit within the tube 1 and being provided with a hollow cylindrical projection 2A, 3A as shown. The cylindrical tubular part 4A of a connecting member 4 constituting one of two such members 4, 5 is then inserted into the upper end of the tube 1 as shown in FIG. 2, so that the projection 2A of the adjacent sealing element 2 locates the tubular part 4A of the connecting member concentrically within the upper end of the tube 1 and the sealing element as a whole holds the member 4 in the correct vertical relationship to the upper end of the tube 1. Before such insertion the inner surface of the upper end portion of the tube and the outer surface of the part 4A may be treated to ensure a satisfactory bond with the cast-bondable plastics material subsequently poured into place as hereinafter described.

The polyurethane or other suitable cast-bondable plastics material 5 in liquid form is then poured into the annular space between the upper end of the tube 1 and the part 4A as shown in FIG. 2, the escape of the material while it remains in a liquid state being prevented by the sealing element 2. The plastics material then sets into a flexible resilient mass and during such setting bonds itself to the tube 1 and the part 4A in a manner known per se.

The tube 1 with the connecting member 4, 4A thus united to it is then turned end for end so that what is the lower end in FIG. 2 becomes the upper end in FIG. 3, and the above process is repeated, with the employment of the sealing element 3, 3A as indicated in FIG. 3 to connect the cylindrical tubular part 5A of the other connecting member 5 to the other end of the tube 1 by means of cast-bondable polyurethane 6.

In some cases instead of employing two flexible sealing elements 2 and 3 as shown in FIGS. 1 to 3, a single sealing element formed as shown at 7 in FIG. 4 with two cylindrical projections 7A may be employed in a method otherwise similar to that described with reference to FIGS. 1 to 3. In the method, the final stage of which is illustrated in FIG. 4, in which corresponding parts have been given the same reference numerals as in FIGS. 1 to 3 the sealing element 6 is first located adjacent to one end of the tube which is disposed so that this end is uppermost and the cast-bondable plastics material 6 is then poured into place and allowed to set, following which the sealing element 7 is pressed, e.g., by a rod inserted through the bore of the connecting piece 4, 4A, into the appropriate position adjacent to the other end of the tube, the tube being turned end for end so that such other end becomes the upper end after which the connecting member 5, 5A is inserted into place and the final pouring of plastics material is effected as shown in FIG. 4.

In the method of constructing a torque transmitting shaft assembly according to the invention as shown in FIG. 5 which shows the final stage, a metallic tube 8 constituting the body of the assembly is arranged with its lower end resting upon a combined sealing and locating element 9 having a locating projection 9A for locating the tube 8 and a locating rib 9B for locating a tubular connecting member 10 which is disposed around and thus located concentrically with the lower end of the tube 8. The bore of the connecting member 10 and the outer circumference of the lower end of the tube 8 may be treated appropriately to ensure a satisfactory bond.

The polyurethane or like cast-bondable plastics material is then poured into the annular space between the lower end portion of the tube 8 and the connecting member 10, and allowed to set into a flexible resilient body and bond itself to the tube and connecting member. The tube is then turned end for end so that as shown in FIG. 5 the other end of the tube rests upon the sealing member 9 with the second connecting member 10A surrounding the projection 9A and the connecting member 10A located by the rib 9B, whereupon the pouring operation is repeated as indicated at 12 in FIG. 5 and the plastics material is allowed to set into a flexible resilient mass 11 bonded to the tube 8 and member 10A and the construction of the unit is complete.

It will be understood that in many cases each of the connecting members in FIG. 5 would be provided with a connecting flange, as indicated in dotted lines at 10B to receive bolts or the like for connection to the appropriate driving and driven parts.

In the modification shown in FIG. 6 in which the final assembly is the same as in FIG. 5, the general method of construction would be similar to that described above with reference to FIG. 5 except that a sealing member 13, which may be destructible, or formed in separable parts to permit detachment from the tube 8 is disposed around the tube 8 and the pouring operations are effected as indicated at 14 in relation to the second connecting member 10, while each of the tubular connecting members surrounds a part of the tube which at the moment is uppermost, the position of the sealing element 13 at the end of the setting period for the plastics material associated with the connecting member 10 in relation to this member being shown in chain line, while the position to which it is then moved for the second pouring operation in relation to the connecting member 10A is shown in full line. As will be seen, the sealing element 13 is located on the outside of the tube 8 and is provided with ribs 13A and 13B which serve respectively to locate the connecting members 10A and 10 correctly during the two pouring operations.

In FIG. 7 the general method of assembly would be the same as that described with reference to FIGS. 1 to 3 except that, before each pouring operation there is disposed around the part 4A or 5A as the case may be and so as to be spaced from it and from the tube 1 a tubular metallic reinforcing element 15 which thus becomes embedded in the plastics material 6. For this purpose each of the sealing elements 2 and 3 includes in addition to the projection 2A or 3A, a groove in which the lower edge of the element 15 is located prior to and during the pouring and setting periods.

The arrangement shown in FIG. 7 allows for increased torsional flexibility in relation to flexibility permitting lack of alignment between the tube 1 and the connecting members 4 and 5, that is to say it reduces the degree to which the parts 4A and 5A can move out of alignment with the tube 1 for a given degree of torsional flexibility.

Whilst the embodiments of FIGS. 1 to 7 all envisage the interconnection of each end of a metallic tube by a torsion joint to another member, the embodiment of FIG. 8 has such a joint at one end only. Thus it incorporates an outer metallic tube 20 having a connection 21 welded thereto at one end and receiving within its other end a second metallic tube 22 having a connection 23 welded to its outer end. The metallic tube 22 extends partially into the outer tube 20 and substantially midway along the length of that part of the tube 22 within the tube 20 is situated a cardboard spacer tube 25 which closely surrounds the outer periphery of a section of the inner tube 22. The tubes 20 and 22 are interconnected by an annulus of polyurethane 27 which is moulded in position by any one of the processes described with reference to the other figures. It will be appreciated that in this construction the annulus of polyurethane is bonded along the whole of its length to the interior of the outer tube 20 but only at its end regions or portions 28 and 29 is it bonded to the inner tube 22 because of the presence of the spacer tube 25. The intermediate portion 35 of the polyurethane annulus is therefore bonded only to the interior of the outer tube 20. In this way therefore the annulus of polyurethane is only effective at the ends of the annulus. In effect this provides two spaced annuli which gives the assembly a high stiffness over a relatively long length of the assembly. At the same time the use of the tube 25 reduces the quantity of polyurethane which is required and insures that there is little or no torsional effect provided by the intervening material between the spaced portions.

FIG. 9 shows an arrangement in which an intermediate metallic sleeve 30 is interposed within an annulus between an inner tube 31 and an outer tube 32, in this case a pair of cardboard spacers 33 being employed to obtain a similar effect as in FIG. 8.

It will be appreciated that whilst in both FIGS. 8 and 9 the spacer tube surrounds the inner member in each case so that the layer of polyurethane is divided into two sections on its inner surface, an alternative possibility would be to place the spacer tube 25 on the interior surface of the external tube 20 with a similar effect as shown in FIG. 8A of the drawings. In either case the effect is to obtain a resilient unit which virtually provides two short lengths of resilient material spaced widely apart. This obtains a conical stiffness and reduces the amount of material required. Whilst cardboard has been suggested above for use in the manufacture of the spacer tubes other materials such as PVC could be used.

The possibility of employing methods of construction according to the invention depends upon the fact that the plastics material employed is cast-bondable as above defined, the advantages of the arrangement deriving largely from the fact that such cast-bondable materials will bond themselves firmly to suitably treated metallic surfaces without the application of pressure, thus making the method of assembly particularly suitable for large scale commercial production.

It will be appreciated that with a torque transmitting shaft, which may for example be 4 feet or more in length, it is extremely important to ensure that the various parts of which it is composed are in coaxial alignment, particularly parts which are interconnected in the manner of the present invention by a resilient annular filling. Accordingly, during the production of the shaft, whether a torsional joint is being formed at one or both ends it is envisaged that the parts will be held by an external fixture in their correct alignment. For example in FIG. 3, the parts 1, 4 and 5; or in FIG. 9, the parts 23, 20 and 21 will be rigidly secured in a fixture to ensure coaxial alignment of the parts 21 and 23 and hence concentricity, and therefore no eccentricity, of the parts 20 and 22, thus producing a balanced construction.

What I claim as my invention and desire to secure by Letters Patent is:

1. A torque transmitting shaft assembly comprising a straight metallic tube constituting the body of the assembly, a connecting member at at least one end of the tube which comprises a metallic part concentric with and spaced by an annular space from the tube, and an annular filling of flexible resilient cast-bondable plastics material, i.e., a material capable in its uncured state of being introduced in a fluid condition and then setting into a resilient mass, the said annular filling being disposed within the said annular space and comprising end portions interconnected by and formed with an intermediate portion, said end portions and intermediate portion being united by bonding during said setting to the whole of one of the surfaces of the tube and connecting member between which it lies, the said end portions only being united by bonding during said setting to the other of the surfaces of the tube and connecting member between which it lies.

2. An assembly as claimed in claim 1 in which the annular filling is united by bonding to the whole of the surface of the tube but only part of the surface of the connecting member between which it lies.

3. An assembly as claimed in claim 2 in which a spacer tube contacts a central region of the connecting member within the annular space.

4. An assembly as claimed in claim 3 in which the spacer tube has a radial thickness which is less than the radial thickness of the annular space whereby end regions of the annular filling on each side of the spacer tube are interconnected by a layer of plastics material bonded to the metallic tube in the region of the spacer tube.

5. An assembly as claimed in claim 1 in which the annular filling is united by bonding to only part of the surface of the tube and to the whole of the surface of the connecting member between which it lies.

6. An assembly as claimed in claim 5 in which a spacer tube contacts a central region of the metallic tube within the annular space.

7. An assembly as claimed in claim 6 in which the spacer tube has a radial thickness which is less than the radial thickness of the annular space whereby end regions of the annular filing on each side of the spacer tube are interconnected by a layer of plastics material bonded to the connecting member in the region of the spacer tube.

8. A method of making a torque transmitting shaft assembly comprising disposing and maintaining concentric with each end of a metallic tube a tubular connecting member with the adjacent circumferential surfaces of each respective connecting member and the metallic tube spaced from one another by an annular space, sealing one end of such each annular space by a sealing element, the same sealing element being employed from the casting process at each end, and pouring or injecting into such annular space from the still open end a cast-bondable plastics material in an uncured and fluid state, which then sets and thus becomes a flexible resilient body bonded to the circumferential surfaces between which it lies the casting process being first carried out at one end with the sealing element thereafter moved to the other end prior to the carrying out of the casting process at the other end.

References Cited

UNITED STATES PATENTS

| | | | |
|---|---|---|---|
| 2,788,650 | 4/1957 | Hagenlocher | 64—11 X |
| 2,154,077 | 4/1939 | Sampson | 64—11 |
| 2,174,223 | 9/1939 | Frauenthal et al. | 64—11 |
| 2,251,804 | 8/1941 | Reuter et al. | 64—11 |
| 2,628,416 | 2/1953 | Sampson | 64—11 X |
| 2,691,283 | 10/1954 | Stover | 64—11 |
| 2,896,431 | 7/1959 | Stillwagon | 64—11 |
| 2,910,843 | 11/1959 | Happ et al. | 64—11 |

JAMES A. WONG, Primary Examiner

U.S. Cl. X.R.
29—436; 64—27